United States Patent
Takai

[19]

[11] Patent Number: 6,128,507

[45] Date of Patent: Oct. 3, 2000

[54] METHOD FOR FORCIBLY DISCONNECTING FAILURE MOBILE STATION FROM CELLULAR MOBILE COMMUNICATION NETWORK

[75] Inventor: Kenichi Takai, Saitama, Japan

[73] Assignee: NEC Corporation, Tokyo, Japan

[21] Appl. No.: 09/059,170

[22] Filed: Apr. 14, 1998

[30] Foreign Application Priority Data

Apr. 24, 1997 [JP] Japan ..................................... 9-107381

[51] Int. Cl.$^7$ ..................................................... H04Q 7/20
[52] U.S. Cl. ............................ 455/524; 455/434; 455/411
[58] Field of Search ............................. 455/63, 67.3, 403,
455/422–424, 410–411, 501, 522, 524,
528, 434

[56] References Cited

U.S. PATENT DOCUMENTS

| | | | |
|---|---|---|---|
| 5,535,429 | 7/1996 | Bergenlid et al. | ................... 455/528 X |
| 5,541,977 | 7/1996 | Hodges et al. | ............................ 455/411 |
| 5,706,333 | 1/1998 | Grenning et al. | ........................ 455/423 |
| 5,708,975 | 1/1998 | Heiskari et al. | ............................ 455/63 |
| 5,809,412 | 9/1998 | Daurio et al. | ............................ 455/410 |
| 5,812,636 | 9/1998 | Tseng | ....................................... 455/423 |
| 5,819,171 | 10/1998 | Hoogerwerf et al. | ................... 455/410 |
| 5,822,318 | 10/1998 | Tiedemann, Jr. et al. | .......... 455/403 X |
| 5,826,186 | 10/1998 | Mitchell et al. | ......................... 455/410 |

FOREIGN PATENT DOCUMENTS

| | | |
|---|---|---|
| 7-46180 | 2/1995 | Japan . |
| 8-32514 | 2/1996 | Japan . |

*Primary Examiner*—William G. Trost
*Attorney, Agent, or Firm*—McGinn & Gibb, P.C.

[57] ABSTRACT

A cellular mobile communication network in a code division multiple access system includes plural base stations covering cells, respectively, a host base station communicable with the plural base stations and plural mobile stations moved in the cells; when a mobile station becomes uncontrollable, the base station communicating the failure mobile station requests the host base station to register the identity code of the failure mobile station in a list of failure stations, and changes the control channel from an original radio frequency to a new radio frequency without informing the failure mobile station of the new radio frequency so as to disconnect the failure mobile station from the cellular mobile communication network; when another mobile station transmits a request for communication to a base station, the base station inquires the host base station whether the request is acceptable or not, and the host base station checks the list to see whether the identity code of the mobile station has been already registered; thus, the failure mobile station never communicates with the base stations, and does not serve as a serious interference power source.

6 Claims, 3 Drawing Sheets

METHOD FOR FORCIBLY DISCONNECTING FAILURE MOBILE STATION FROM CELLULAR MOBILE COMMUNICATION NETWORK

FIELD OF THE INVENTION

This invention relates to a cellular mobile communication technology and, more particularly, to a method for forcibly disconnecting a failure mobile station from a cellular mobile communication network established in a code division multiple access system.

DESCRIPTION OF THE RELATED ART

There are several signal transmission technologies available for the cellular mobile communication network. The code division multiple access system is established in one of the signal transmission technologies, and provides channels between base stations and mobile stations by utilizing the orthogonal characteristics of a code. Another signal transmission technology is called as "frequency division multiple access system". In the frequency division multiple access system, channels are divided along the frequency axis, and a piece of information is transferred through the divided channel. A time division multiple access system is yet another signal transmission technology. The channels are divided along the time axis, and a piece of information is transferred through the divided channel. These signal transmission technologies have been developed with emphasis on how effectively utilize the finite wireless resource. For example, the narrow bandwidth modulation technique was developed for the frequency division multiple access system, and the high efficiency encoding technique and the high speed switching technique are for the time division multiple access system.

Plural subscribers share a certain frequency in the code division multiple access system, and the signal to interference noise ratio, which is usually abbreviated as "SIR", sets limit on the communication capacity, because a large signal to interference noise ratio increases the error rate.

In a cellular mobile communication network established in the code division multiple access system, an area covered by a single base station is called as "cell", and there are many mobile stations communicating with the base station. The distance to the base station and influential obstacles are different between the mobile stations, and, for this reason, the base station receives transmit signals from the mobile stations at different levels. There is a possibility that a transmit signal with small power hardly achieves the target signal to interference noise ratio due to another transmit signal with large power. This means that the mobile station transmitting the signal with the small power fails to communicate with the base station.

The problem is solved by equalizing the power levels of the signals received by the base station. In order to equalize the power levels of the received signals, each of the mobile stations is expected to appropriately control the transmission power depending upon the communication environment, and the code division multiple access system requires a high speed high precision transmission power control technology.

Japanese Patent Publication of Unexamined Application (JPA) No. 8-32514 discloses a transmission power control technology. The Japanese Patent Publication of Unexamined Application proposes to control the transmission power of a mobile station through an open loop or a closed loop depending upon the communication environment. When the mobile station selects the open loop control, the mobile station measures the electric power of a received signal from the base station, and changes the transmission power depending upon the electric power of the received signal by itself. On the other hand, while the transmission power is controlled through the closed loop, the base station measures the electric power of a signal transmitted from a mobile station, and determines an appropriate transmission power for a signal to be transmitted from the mobile station. The base station instructs the appropriate transmission power to the mobile station, and the mobile station changes the transmission power in response to the instruction. The communication environment of each mobile station is drastically varied due to the fading and the shadowing, and the mobile station selects the open loop control and the closed loop control so as to continue the communication with the base station.

The prior art transmission power controlling technology disclosed in the Japanese Patent Publication of Unexamined Application is effective against the continuous variation in communication environment. However, the prior art transmission power controlling technology does not take the influence of a failure mobile station or a mobile station uncontrollable in transmission power. If a failure mobile station continuously transmits a signal at large transmission power, the signal transmitted at the large power makes the signal to interference noise ratio of other signals lower than the threshold level, and the other non-failure mobile stations can not continue the communication with the base station.

Another prior art transmission power controlling technology is disclosed in Japanese Patent Publication of Unexamined Application (JPA) No. 7-46180. The Japanese Patent Publication of Unexamined Application proposes to reduce the electric power of a received signal serving as interference noise. A mobile station is assumed to be uncontrollable and transmit a signal at extremely large power. The failure mobile station is communicating with a base station together with mobile stations. The base station receives the signal from the failure mobile station and the signals from the other mobile stations, and these signals serve as signal components of a received signal. The base station averages the power of each signal component, and compares the average power with a reference power to see whether or not the average power is more than the reference power by a predetermined value. If the base station diagnoses that the failure mobile station transmits the signal at the average power more than the reference power by the predetermined value, the base station modulates the received signal from the failure mobile station, and spreads it, again. Thereafter, the base station subtracts the spread signal component from the received signal. Thus, the base station reduces the interference power.

Although the prior art transmission power control technology disclosed in Japanese Patent Publication of Unexamined Application No. 7-46180 prevents the signals from non-failure mobile stations from serious interference, the signal receiving section of the base station requires a facility for the modulation and the spreading, and is expected to control the phase and the amplitude of the demodulated signal component in dependence on the signal from the failure mobile station strongly affected by the communication environment. Such a high-speed high-precision control technology requires complicated circuits, and the prior art transmission power control technology is not economical.

SUMMARY OF THE INVENTION

It is therefore an important object of the present invention to provide a method for forcibly disconnecting a failure mobile station from a cellular mobile communication network.

To accomplish the object, the present invention proposes to manage a cellular communication network as if a failure mobile station is outside an communicable area of the cellular mobile communication network.

In accordance with one aspect of the present invention, there is provided a method of forcibly disconnecting a failure mobile station from a cellular mobile communication network, comprising the steps of finding a failure mobile station, specifying an identity code assigned to said failure mobile station, and managing said cellular mobile communication network as if said failure mobile station is outside a communicable area of said cellular mobile communication network.

The cellular mobile communication network may use a code division multiple access technology.

The management may be carried out by temporarily changing a control channel so as to forcibly disconnect the failure mobile station from the cellular mobile communication network.

The management may be carried out by checking a list of failure mobile stations to see whether or not a request for communication is acceptable.

BRIEF DESCRIPTION OF THE DRAWINGS

The features and advantages of the method will be more clearly understood from the following description taken in conjunction with the accompanying drawings in which.

DESCRIPTION OF THE PREFERRED EMBODIMENT

Figure 1:
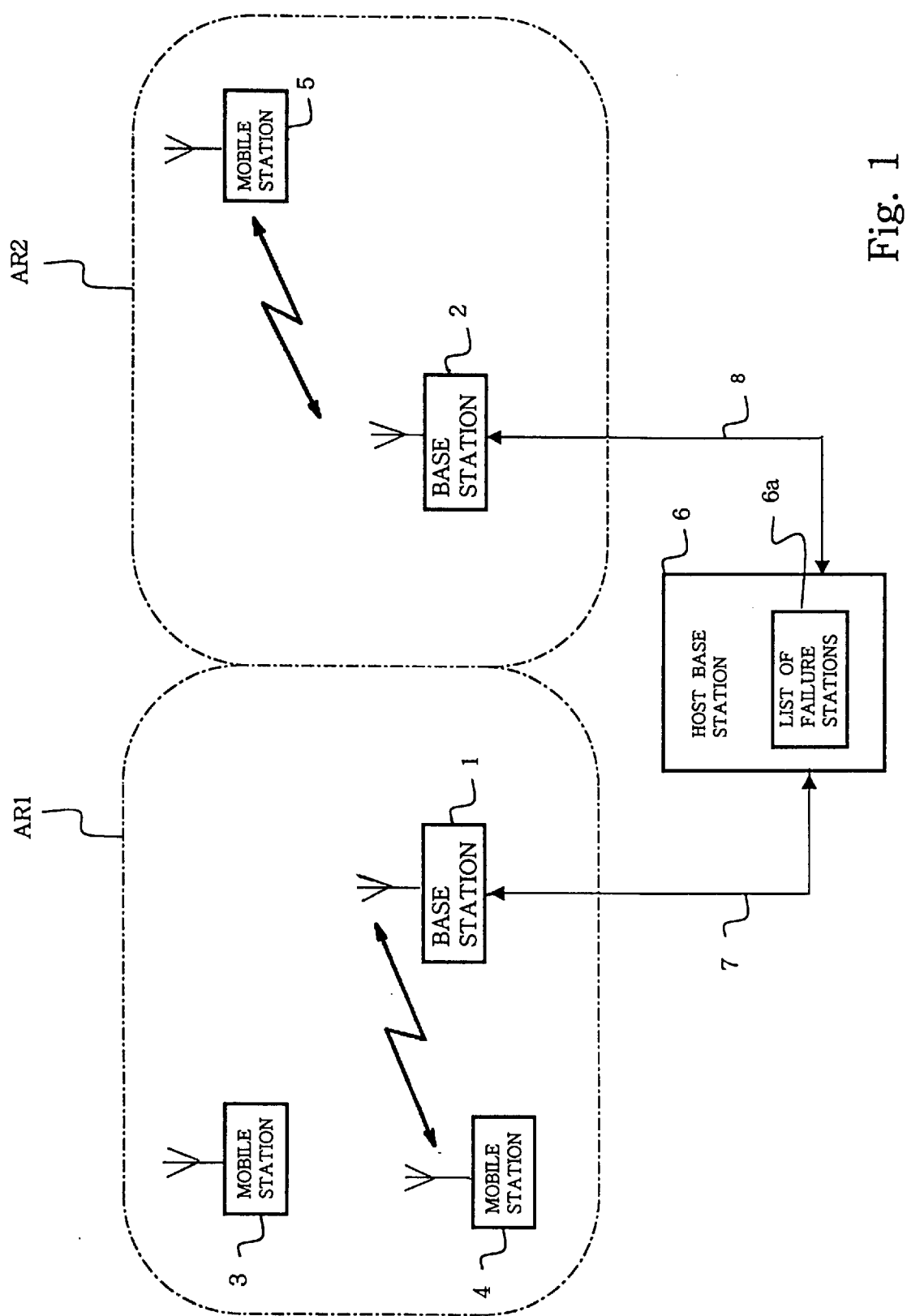
FIG. 1 is a schematic view showing a cellular mobile communication system according to the present invention.

Referring first to FIG. 1 of the drawings, a cellular mobile communication network embodying the present invention comprises plural base stations 1 and 2, mobile stations 3, 4 and 5 and a host base station 6, and the wireless communication between the base stations 1/2 and the mobile stations 3 to 5 is managed under the code division multiple access technology The base stations 1 and 2 cover cells AR1 and AR2, respectively, and the cells AR1 and AR2 are contiguous to each other. The mobile stations 3 and 4 and the mobile station 5 are now moving in the cell AR1 and the other cell AR2, respectively, and communicate with the base stations 1 and 2, respectively. The base stations 1/2 are connected through suitable cables 7/8 to the host base station 6, and a list 6a for failure stations is stored in the host base station 6. The mobile stations 3 to 5 are assigned identity codes, respectively, and the identity code of a failure mobile station is written in the lost 6a.

Figure 2A:
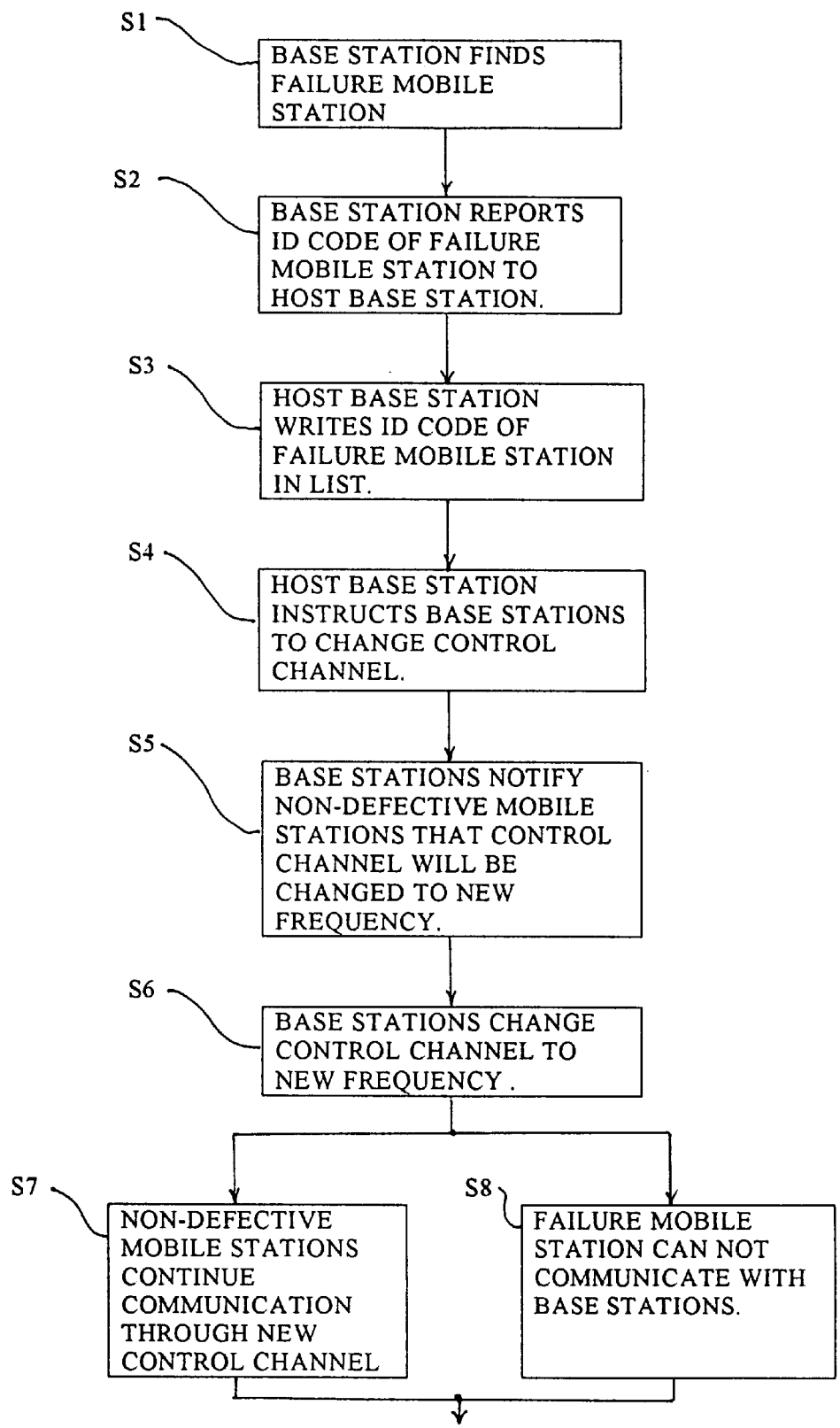
FIGS. 2A and 2B are flowcharts showing a control sequence for disconnecting a failure mobile station from the cellular mobile communication system.
Figure 2B:
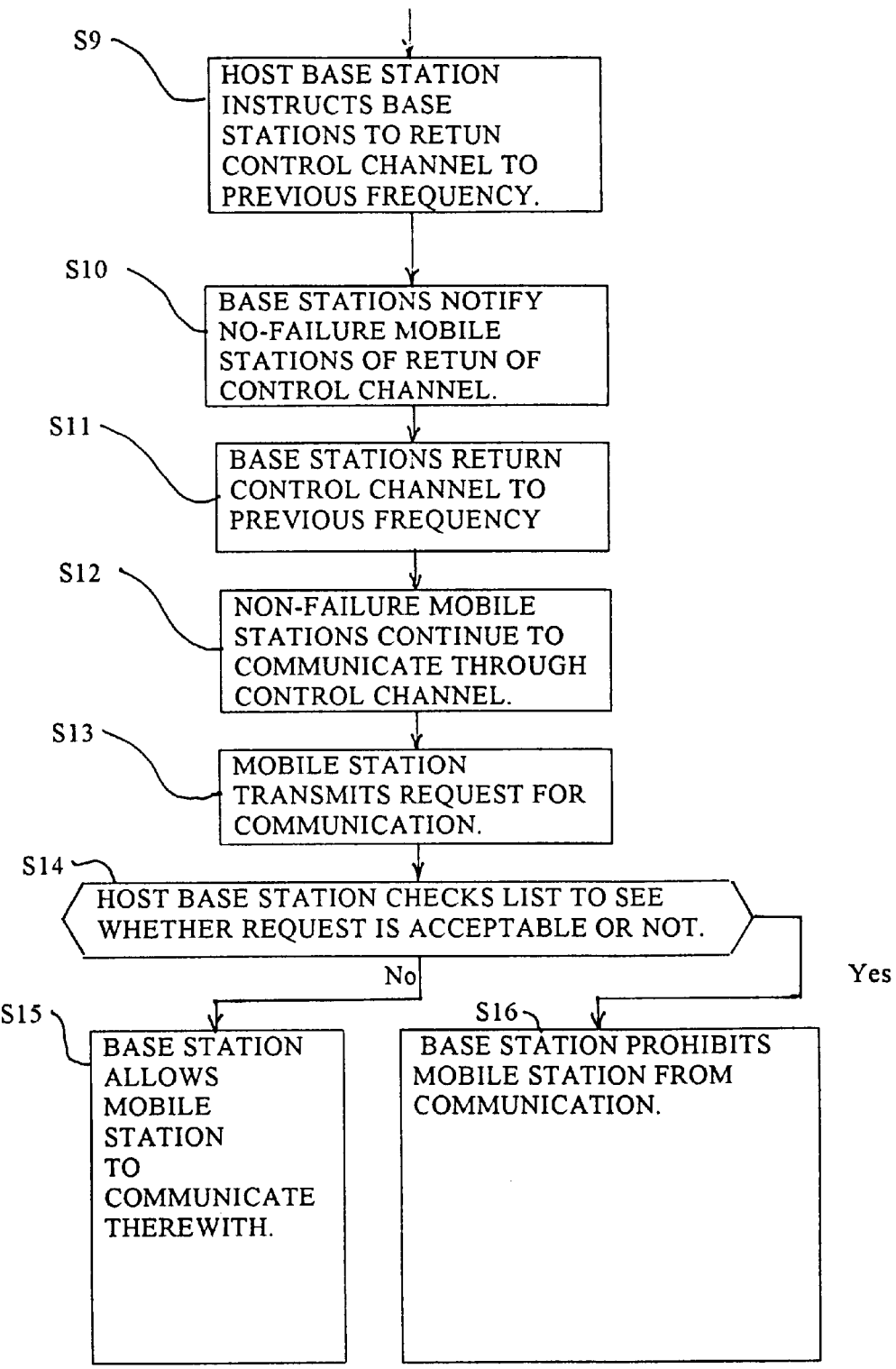

Description is hereinbelow made on a method of disconnecting a failure mobile station from the cellular mobile communication network on the assumption that the mobile station 3 becomes uncontrollable. FIGS. 2A and 2B illustrate the method according to the present invention. Although the transmission power is uncontrollable, the mobile station 3 is communicating with the base station 1, and the signal from the mobile station 3 to the base station 1 behaves as interference power for the other signal from the other mobile station 4 to the base station 1. The base station 1 transmits an instruction for a change of transmission power from the failure mobile station 3 to the base station 1. However, the mobile station 3 does not respond to the instruction, and the transmission power becomes uncontrollable. In this situation, the base station diagnoses the mobile station to be a failure station as by step S1, and decides the mobile station 3 to be disconnected from the cellular mobile communication network. When the mobile station 3 does not respond to any instruction from said base station 1, the base station also diagnoses the mobile station 3 to be a failure station. The base station 21 may diagnose the mobile station 3 through a method of detecting a failure mobile station disclosed in Japanese Patent Application No. 9-104949, and a patent application for the method is filed in the Patent Office as similar to the present invention. Although the base station 1 tries to disconnect the failure mobile station 3 from the cellular mobile communication network, the base station 1 fails to disconnect the failure mobile station 3.

The base station 1 reports the identity code assigned to the failure mobile station 3 to the host base station 6 as by step S2, and the host base station 6 writes the identity code of the failure mobile station 3 in the list 6a as by step S3. The host base station 6 instructs the base station 1 and the base station 2 adjacent thereto to change a control channel as by step S4.

With the instruction, the base station 1 previously notifies the non-failure mobile station 4 of the change of control channel as by step S5. However, the base station 1 does not notify the failure mobile station of the change of control channel. The change of control channel is achieved by changing a radio frequency used for the communication between the mobile station and the base station. For example, the base station 1 informs the mobile station 4 that the control channel is changed to radio frequency zz channel at time xx yy. Another cellular mobile communication system may change a pseudo noise code used for the control channel.

The base stations 1 actually changes the control channel to radio frequency zz channel at time xx yy as by step S6. Even though the base station 1 changes the control channel, the non-failure mobile station 4 can continue the communication with the base station 1 as by step S7, because the new control channel has been already informed. However, the failure mobile station 3 can not communicate with the base station 1 as if it is outside the boundary of the communicable area as by step S8. Thus, the failure mobile station 3 is forcibly disconnected from the cellular mobile communication network, and does not behave a source of interference power source.

After steps S7 and S8, the host base station 6 notifies the base stations 1/2 to change the control channel to the previous radio frequency channel as by step S9, and the base station 1 notifies all the mobile stations, i.e., both nonfailure and failure mobile stations 3/4 to change the control channel to the previous radio frequency channel as by step S10. After the previous notice, the base stations 1 actually changes the control channel to the previous radio frequency channel as by step S11. Even though the control channel is changed, again, the non-failure mobile station 4 can continue the communication with the base station 4 as by step S12.

Thereafter, when the mobile station 5 requests the base station 2 to communicate therewith as by step S13, the base station 2 informs the host base station 6 of the identity code of the mobile station 5, and asks the host base station 6 whether or not the mobile station 5 is inhibited from communication. The host base station 6 checks the list 6a whether or not the identity code has been already listed as by step S14. If the mobile station 5 is not listed as a failure station, the host base station 6 informs the base station 2 of the acceptance of the request, and the base station 2 allows the non-failure mobile station 5 to communicate therewith as by step S15. On the other hand, if the mobile station 5 has been already diagnosed to be a failure station, the host base station 6 informs the base station 2 of the refusal of the request, and the base station 2 prohibits the failure mobile station 5 from the communication therewith as by step S16. Thus, even if a failure mobile station requests an other base station to communicate through the previous control channel, the failure mobile station is never connected to the cellular mobile communication network, nor seriously affects the communication between a non-failure mobile station and the base station.

As will be appreciated from the foregoing description, the failure mobile station is virtually evacuated from the communicable area, and is forcibly disconnected from the cellular mobile communication network. As a result, the failure mobile station does not seriously affect the communication between a non-failure mobile station and the base station.

Moreover, the identity code of the failure mobile station is registered in the list stored in the host base station. Even if the failure mobile station requests another base station to communicate therewith, the base station asks the host base station to see whether the request is acceptable or not. If the failure mobile station has been already registered, the host base station instructs the base station to refuse the request. Thus, the failure mobile station never enters into the cellular mobile communication network, nor behaves as a interference power source.

Although a particular embodiment of the present invention has been shown and described, it will be apparent to those skilled in the art that various changes and modifications may be made without departing from the spirit and scope of the present invention. For example, the present invention may be applied to another wireless communication network in another transmission power control system.

What is claimed is:

1. A method of forcibly disconnecting a failure mobile station from a cellular mobile communication network by managing said cellular mobile communication network as if said failure mobile station is outside a communication area of said cellular mobile communication network, said method comprising:

informing non-failure mobile stations of a change of a control channel;

changing said control channel so that said non-failure mobile stations are communicable and said failure mobile station is disconnected from said cellular mobile communication network;

informing said non-failure mobile stations of a return of said control channel; and returning said control channel so that said non-failure mobile stations continue to communicate without an interference of said failure mobile station.

2. The method as set forth in claim 1, in which said change of said control channel is achieved by changing a radio frequency from an original value to another value, and said return of said control channel is achieved by changing said radio frequency from said another value to said original value.

3. The method as set forth in claim 1, in which said change of said control channel is achieved by changing a pseudo noise code from an original code to another, and said return of said control channel is achieved by changing said pseudo noise code from said another to said original code.

4. A method for forcibly disconnecting a failure mobile station from a cellular mobile communication network by managing said cellular mobile communication network as if said failure mobile station is outside a communicable area of said cellular mobile communication network, said method comprising:

informing a host station communicable with plural base stations by one of said plural base stations, an identity code of said failure mobile station;

receiving a request for communication by another of said plural base stations and inquiring from said host base station whether said request for communication is acceptable or not;

storing said identity code of said failure mobile station by said host base station in a list of failure stations;

checking said list of failure stations to see whether or not said identity code of said mobile station is found in said list when said mobile station transmits said request for communication;

informing said another of said plural base stations of the result of said checking; and allowing said another of plural base station to communicate if said identity code is not found and refusing said request when said identity code is found in said list.

5. A method for forcibly disconnecting a failure mobile station from a cellular mobile communication network by managing said cellular mobile communication network as if said failure mobile station is outside a communicable area of said cellular mobile communication network, said method comprising:

storing an identity code of said failure mobile station in a list;

informing non-failure mobile stations of a change of a control channel;

changing said control channel so that said non-failure mobile stations are communicable and said failure mobile station is disconnected from said cellular mobile communication network;

informing said non-failure mobile stations of a return of said control channel;

returning said control channel so that said non-failure mobile stations continue to communicate without an interference of said failure mobile station;

checking said list of failure stations to see whether or not an identity code of a mobile station is found in said list when a mobile station transmits a request for communication; and allowing said mobile station to communicate if said identify code is not found in said list, or refusing said request when said identity code is found in said list.

6. The method as set forth in claim 5 wherein:

one of plural base stations carries out finding said failure mobile station and specifying said identity code assigned to said failure mobile station, and reporting said identity code of said failure mobile station to a host base station communicable with said plural base stations;

said host base station carries out said storing said identity code of said failure mobile station in a list, checking said list of failure stations; and informing another of said plural base stations of the result of said check said list; and said another of said plural base station carries out inquiring from said host base station whether said request for communication is acceptable or not.

* * * * *